United States Patent [19]
Seibel

[11] Patent Number: 4,719,010
[45] Date of Patent: Jan. 12, 1988

[54] APPARATUS FOR RINSING A FIXED BED ION EXCHANGER

[75] Inventor: Heinrich Seibel, Hardthausen-Lampoldshausen, Fed. Rep. of Germany

[73] Assignee: Cillich mie Ernst Vogelmann GmbH & Co., Heilbronn, Fed. Rep. of Germany

[21] Appl. No.: 930,511

[22] Filed: Nov. 12, 1986

[30] Foreign Application Priority Data

Nov. 13, 1985 [DE] Fed. Rep. of Germany ....... 3540267

[51] Int. Cl.$^4$ .............................................. B01J 49/00
[52] U.S. Cl. ................................... 210/189; 210/268; 210/275; 210/284
[58] Field of Search ............... 210/675, 189, 268, 284, 210/269, 275–279, 293; 521/26

[56] References Cited

U.S. PATENT DOCUMENTS

| | | | |
|---|---|---|---|
| 1,745,421 | 2/1930 | Higgins | 210/189 |
| 3,667,604 | 6/1972 | Lagoutte | 210/189 |
| 4,197,201 | 4/1980 | Hjelmner et al. | 210/189 |
| 4,330,401 | 5/1982 | Boze et al. | 210/268 |

*Primary Examiner*—Ivars Cintins
*Attorney, Agent, or Firm*—Erwin S. Teltscher

[57] ABSTRACT

A back rinse arrangement for ion exchange resin in an ion exchange bed through which a liquid to be treated flows in a substantially vertical direction to have contaminants captured therefrom in the ion exchange resin includes an inlet chamber arranged at a lower region of the fixed bed, an injector that opens into the inlet chamber and has a transporting and rinsing liquid selectively supplied thereto, and a conveying and cleansing pipe which extends vertically through the fixed bed and provided with an outlet opening at its upper end. The particulate ion exchange resin, which is particulate or granular, is gradually withdrawn by the flowing transporting and rinsing liquid from the lower region of the fixed bed, and is conveyed through the conveying and cleansing pipe, with simultaneous performance of a cleansing action, to the upper region of the fixed body which gradually descends as the ion exchange material is being withdrawn from its bottom region. The transporting and rinsing liquid which has been contaminated by the contaminants released from the ion exchange resin during its regeneration is removed from the fixed bed.

6 Claims, 6 Drawing Figures

Fig. 6

APPARATUS FOR RINSING A FIXED BED ION EXCHANGER

BACKGROUND OF THE INVENTION

The present invention relates to ion exchangers in general, and more particularly to a method of and arrangement for regenerating by rinsing a particulate ion exchange resin contained in a fixed bed through which a liquid to be treated passes substantially vertically during a treating phase of operation of the arrangement.

In the performance of water treatment or purification, there are being currently used, among others, fixed bed ion exchangers which are being operated with an upward liquid flow during a treatment phase of operation, and with a downward liquid flow during a regeneration phase of operation. Although the fixed bed ion exchangers with this upward flow/downward flow operation have many advantages, such as a low consumption of chemicals, of water needed for operation, and of space, as well as the ease with which the operation of such arrangements can be automated, the heretofore known arrangements had an important disadvantage which stood in the way of their finding widespread acceptance and use, namely, that no resin backwashing was possible in the ion exchange column.

On the other hand, in known floating bed processes, the resin is conveyed for the backwashing thereof into a separate rinsing container. This backwashing process is rather expensive and thus suitable for economical use only in large and costly industrial installations, but not in installations intended for small-scale, such as household, use.

SUMMARY OF THE INVENTION

Accordingly, it is a general object of the present invention to avoid the disadvantages of the prior art.

More particularly, it is an object of the present invention to provide a method of regenerating the ion exchange resin of a fixed bed ion exchanger, which method does not possess the drawbacks of the known methods of this type.

Still another object of the present invention is to devise a method of the type here under consideration which renders it possible to perform a backwashing operation in a space-saving manner within the fixed bed.

A further object of the present invention is to develop an arrangement suited for the performance of the above method.

It is yet another object of the present invention to design the above arrangement in such a manner as to keep the space consumption of the installation as a whole to a minimum.

A concomitant object of the present invention is so to construct the arrangement of the above type as to be relatively simple in construction, inexpensive to manufacture, easy to use, and yet reliable in operation.

In keeping with these objects and others which will become apparent hereafter, one feature of the present invention resides in a method of regenerating a particulate ion exchange resin contained in a fixed bed of at least one fixed bed ion exchanger operated with a substantially vertical flow of liquids therethrough, this method comprising the steps of removing contaminants from the particulate ion exchange resin by gradually withdrawing the particulate ion exchange resin from one of upper and lower regions of the fixed bed and continuously conveying the withdrawn particulate ion exchange resin with attendant loosening and cleansing thereof by a stream of a transporting and rinsing liquid to the other of the regions of the fixed bed for deposition thereat while the remaining particulate ion exchange resin of the fixed bed is caused to gradually advance to the one of the upper and lower regions; and discharging the transporting and rinsing liquid, which has become contaminated by the contaminants released from the particulate ion exchange resin during the removing step, from the fixed bed. Advantageously, the removing step includes withdrawing the particulate ion exchange resin from the lower region of the fixed bed and depositing the particulate ion exchange resin at the upper region of the fixed bed.

The present invention is also directed to an ion exchange arrangement which comprises confining means including liquid-permeable upper and lower retaining elements for confining at least one fixed bed of a particulate ion exchange resin; means for causing liquid to be treated to flow substantially vertically through the fixed bed during a treating phase of operation of the arrangement; means for regenerating the particulate ion exchange resin after the same has been contaminated by contaminants captured from the liquid being treated during the treating phase, including a conveying and cleansing pipe extending between the upper and lower retaining elements and having at least one inlet opening and one outlet opening each situated in the vicinity of a different one of the upper and lower retaining elements and open toward the fixed bed, means for directing a stream of a transporting and rinsing liquid through the inlet opening into the conveying and cleansing pipe for continuously withdrawing the particulate ion exchange resin from the fixed bed at the vicinity of the inlet opening, for continuously conveying the withdrawn particulate ion exchange resin through the conveying and cleansing pipe with attendant loosening and cleansing thereof, and for continuously discharging the particulate ion exchange resin from the outlet opening for deposit on the fixed bed, while the remaining particulate ion exchange resin of the fixed bed is caused to gradually advance to the inlet opening; and means for removing the transporting and rinsing liquid, which has become contaminated by the contaminants released from the contaminated particulate ion exchange resin during the regeneration of the latter, from the fixed bed, including at least one removing outlet situated externally of the retaining elements.

The present invention is based on the premise that it is much more effective and efficient to perform the backwashing or regeneration of the particles or granules of the ion exchange resin, which will be referred to herein as a particulate ion exchange resin for simplicity, of a fixed ion exchange bed consecutively in small amounts, advantageously in a continuously performed operation, rather than all at once. Accordingly, it is proposed in accordance with the present invention to gradually withdraw the ion exchange resin by a flowing transporting and rinsing liquid from the lower or the upper region of the fixed bed, and then to convey the withdrawn ion exchange resin to the respectively other of the upper and lower regions of the fixed bed where this ion exchange resin is gradually deposited on the fixed bed while the remainder of the fixed bed advances to the location of withdrawal of the resin. The withdrawn ion exchange resin is subjected to turbulence while being conveyed with an attendant mechanical cleansing effect, so that contaminants, which have been captured by the ion exchange resin from the liquid being treated during a treating phase of operation of the ion exchanger, and which mostly adhere to the outer surfaces of the particles of the ion exchange resins, are released from these particles and dispersed in the transporting and rinsing liquid. Then, the transporting and rinsing liquid which has been charged with such released contaminants can be removed from the ion exchanger.

According to an advantageous aspect of the present invention, the conveying and cleansing pipe extends vertically and centrally through the fixed bed. There is advantageously provided means for bounding an inlet chamber situated at the inlet opening of the conveying and cleansing pipe and open toward the fixed bed. The directing means advantageously includes an injector aimed across the inlet chamber at the inlet opening of the conveying and cleansing pipe, and means for supplying the transporting and rinsing liquid to the injector, and the removing outlet is vertically spaced from the fixed bed and is separated therefrom by one of the retaining elements. In this context, it is particularly advantageous when the inlet chamber is situated at a lower region of the fixed bed and when the injector includes a propelling jet nozzle which opens substantially vertically from below into the inlet chamber, and a receiving nozzle situated oppositely to the propelling jet nozzle at an upper region of the inlet chamber and diverging toward the conveying and cleansing pipe. In an advantageous construction of the arrangement of the present invention, the lower retaining element is a funnel-shaped sieve bottom, and the means for bounding the inlet chamber includes a bottom bulge penetrated by the propelling jet nozzle and having the particulate ion exchange resin admitted thereto upwardly of the funnel-shaped sieve bottom, and a dome-shaped lid member extending over the bottom bulge and carrying the receiving nozzle. Advantageously, the inlet chamber has at least one admission opening extending from the sieve bottom to the bottom bulge, and the propelling jet nozzle extends into the interior of the inlet chamber and is surrounded by the bottom bulge.

According to another advantageous facet of the present invention, the above arrangement further includes means for forming an outlet chamber at and in communication with an upper end of the conveying and cleansing pipe, the outlet chamber being open toward the fixed bed and the forming means including a lid portion which is connected with the upper retaining element for the fixed bed.

Advantageously, the arrangement of the present invention comprises two ion exchange columns capable of having the liquid to be treated flow therethrough in parallel during the treatment phase and each including the regenerating means for regenerating the contaminated ion exchange resin of the fixed bed thereof independently of that of the respectively other ion exchange column.

It will be appreciated that, when the arrangement of the present invention is constructed in the above-discussed manner and when the inlet chamber is situated, as currently preferred, at the lower end of the conveying and cleansing pipe, the stream of the transporting and rinsing liquid which is generated by the injector during the regeneration phase of operation of the ion exchange installation entrains the particles of the fixed bed layer by layer at the lower region of the fixed bed and transports these entrained particles upwardly to the upper region of the fixed bed. As a result of this, circulation of the entire fixed bed within the ion exchanger column is obtained within a relatively short period of time. During this circulation, all of the resin is cleansed particle by particle or granule by granule, simultaneously loosened, and rid of contaminants and abraded resin.

Due to the very high flow velocity of the water/particulate resin mixture at the region of the injector and of the conveying and cleansing pipe of the present invention, there is obtained a much more intensive cleansing of the granules or particles of the ion exchange resin than when proceeding in accordance with the customary method, without adversely affecting or damaging the constitution of the individual particles or granules of the ion exchange resin. Another advantage of this intensive backwashing resides in the germ reduction and in the consequent improvement of the hygienic properties of the water being treated.

Furthermore, the required rinsing water amount and the regeneration and backwashing time are significantly reduced. As a result of the saving on the backwashing space, there is obtained a compact and relatively inexpensive construction which does not include any movable and eroding parts.

BRIEF DESCRIPTION OF THE DRAWING

The present invention will be described below in more detail with reference to the accompanying drawing in which.

DETAILED DESCRIPTION OF THE PREFERRED EMBODIMENT

Figure 1:
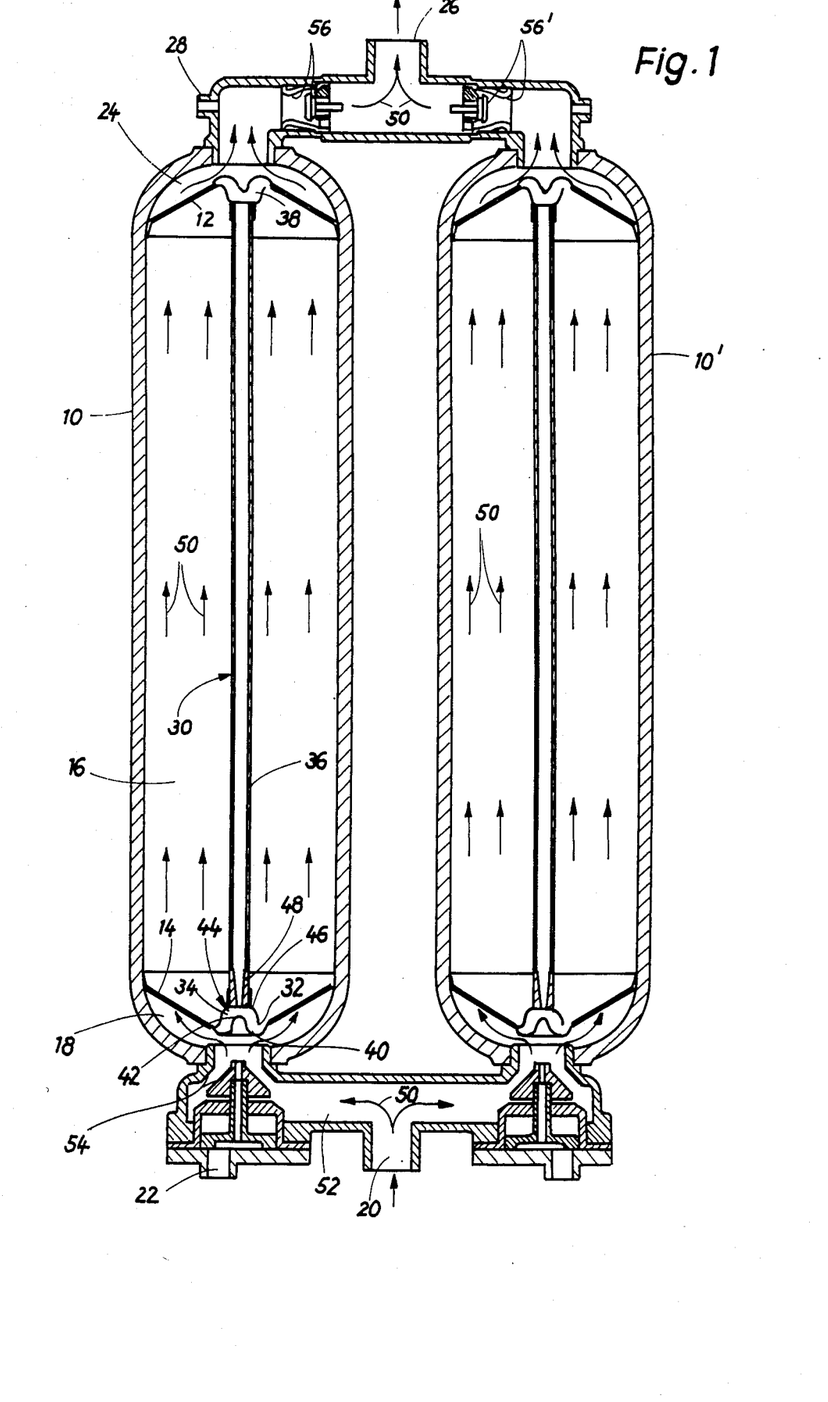
FIGS. 1 to 3 are vertical sectional views through an ion exchange installation of the present invention including two ion exchange columns, in different phases of operation of the installation.
Figure 6:
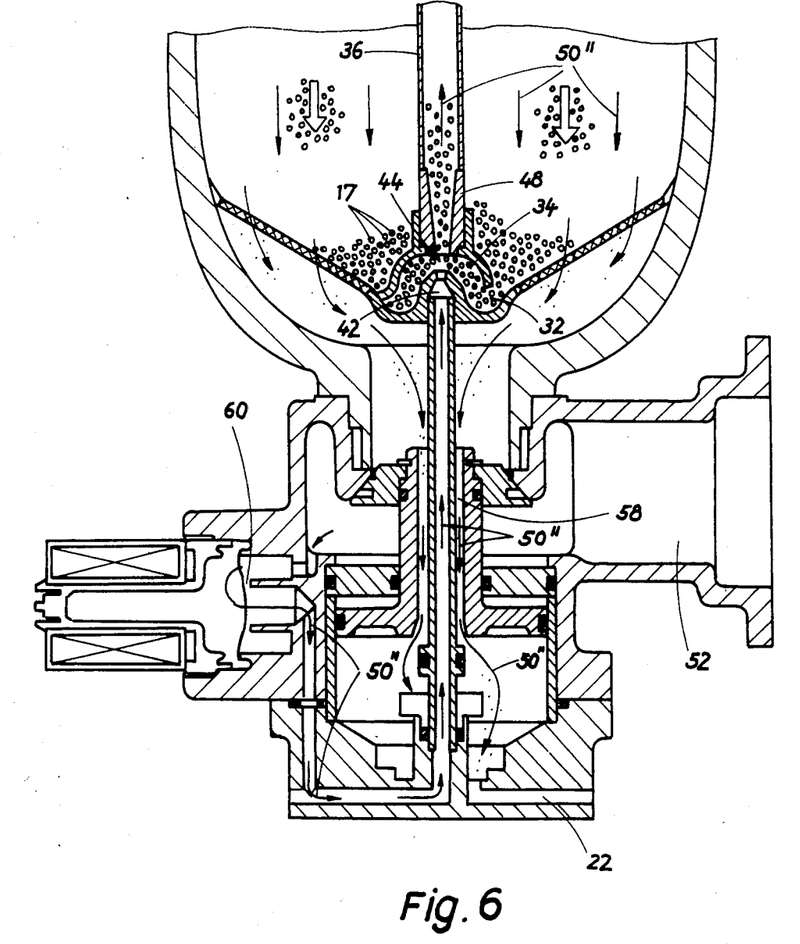

Referring now to the drawing in detail, and first to FIG. 1 thereof, it may be seen that the reference numerals 10 and 10' have been used therein to identify two exchange columns of an ion exchanger which is constructed as a double ion exchange installation and is preferably intended for water softening. Each of the exchange columns 10 and 10' contains a fixed bed 16 containing particulate or granular exchange resin 17 (as indicated in FIG. 6). The fixed bed 16 is upwardly and downwardly delimited or confined by respective upper and lower liquid-permeable retaining elements 12 and 14. During the operation of the ion exchanger, liquid flows through the fixed bed 16 in the upward direction while operating in a treatment mode and in the downward direction while operating in a regeneration mode (upward current/countercurrent process).

The lower region of the fixed bed 16 of the exchange resin 17 rests on the lower retaining element 14 which is constructed as a funnel-shaped sieve or filter bottom, so that hydraulic communication is established through the lower retaining element 14 between the fixed bed 16 and a distribution chamber 18 which is situated below the lower retaining element 14. The distribution chamber 18 is, in turn, selectively connectable by suitable fittings with a hard water supply conduit 20 and with a waste water channel 22. The upper region of the fixed bed 16 of the exchange resin 17 is selectively connected through a collecting chamber 24 and suitable fittings with a softened water outlet 26, a regeneration medium inlet 28, and a rinsing medium outlet 28'.

A backwash arrangement 30 is integrated in each of the exchange columns 10 and 10'. As indicated particularly in FIG. 6 of the drawing, each backwash arrangement 30 basically includes an inlet chamber 34 arranged at the lower region of the fixed bed 16 and communicating with the lower region of the fixed bed 16 through at least one lateral opening 32. The opening 32 is disposed upwardly of the funnel-shaped sieve or filter bottom or lower retaining element 14 and is so dimensioned as to permit penetration of the exchange resin 17 into the inlet chamber 34. The arrangement 30 also includes a conveying and cleansing riser pipe 36 that axially passes through the fixed bed 16 commencing at the inlet chamber 34, and an outlet chamber 38 which, as shown in FIG. 1, is arranged at the upper end of the riser pipe 36 and is open toward the upper region of the fixed bed 16. It may also be seen in FIG. 6 of the drawing that the inlet chamber 34 is provided at its lower region with an annular bottom protuberance or bulge 40, and that a propelling jet nozzle 42 of an injector 44 extends axially from below into the bottom protuberance 40. The inlet chamber 34 is delimited from above by a dome-shaped lid 46 which is provided with an upwardly diverging receiving nozzle 48 of the injector 44. The receiving nozzle 48 is connected with the pipe 36.

Having so described the construction and the basic components of the ion exchange installation of the present invention, the operation of this installation will now be discussed in some detail, still with reference to the accompanying drawing.

Figure 4:
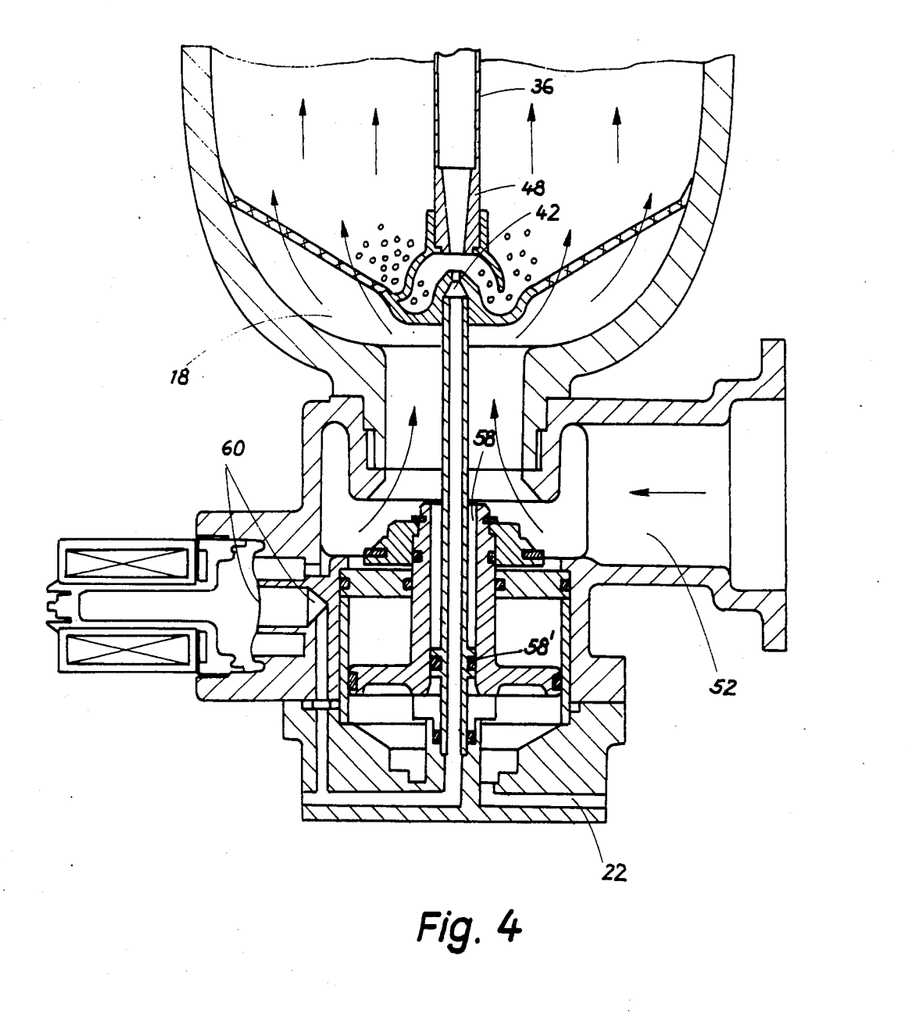
FIGS. 4 to 6 are views similar to and corresponding respectively to FIGS. 1 to 3 of the drawing, but showing only a lower portion of the left-hand ion exchange column at an enlarged scale.

In an operating condition of the two columns 10 and 10' which is indicated in FIGS. 1 and 4 of the drawing by arrows 50, the hard water to be treated is supplied from below to the fixed exchange resin bed 16 through the hard water supply conduit 20, a distribution conduit 52 and a respective valve 54 which is then in its open position. Upon reaching the fixed bed 16, the hard water to be treated flows upwardly through the fixed bed 16 and eventually reaches, through the upper retaining element 12, the collecting chamber 24, from where it flows through a respective one-way or check valve 56 or 56' to the softened water outlet 26. As can be seen particularly in FIG. 4 of the drawing, flow from the distribution chamber 18 through a valve channel 58 to the waste water channel 22 is prevented by a valve body 58'. Simultaneously, flow of the hard water from the distribution conduit 52 to the propelling jet nozzle 42 is prevented by a diaphragm valve 60.

Figure 2:
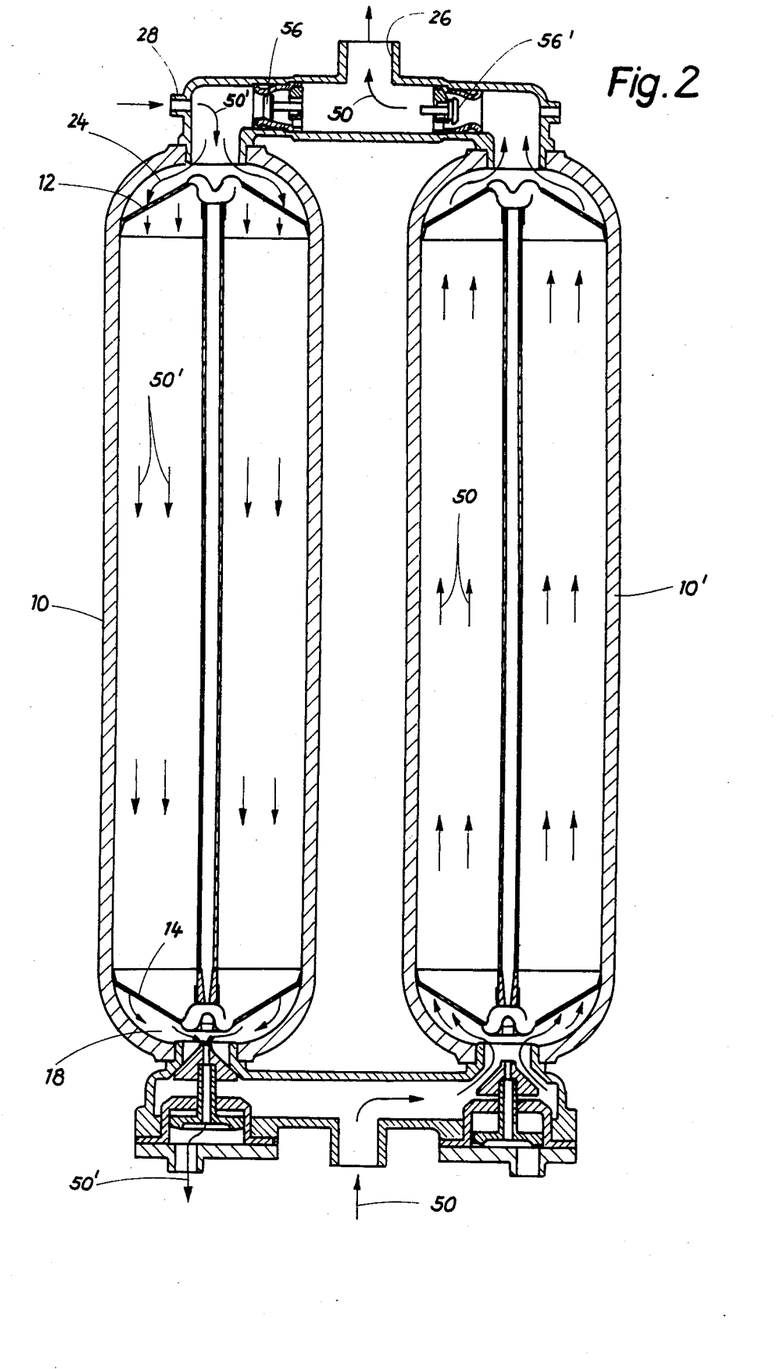
Figure 5:
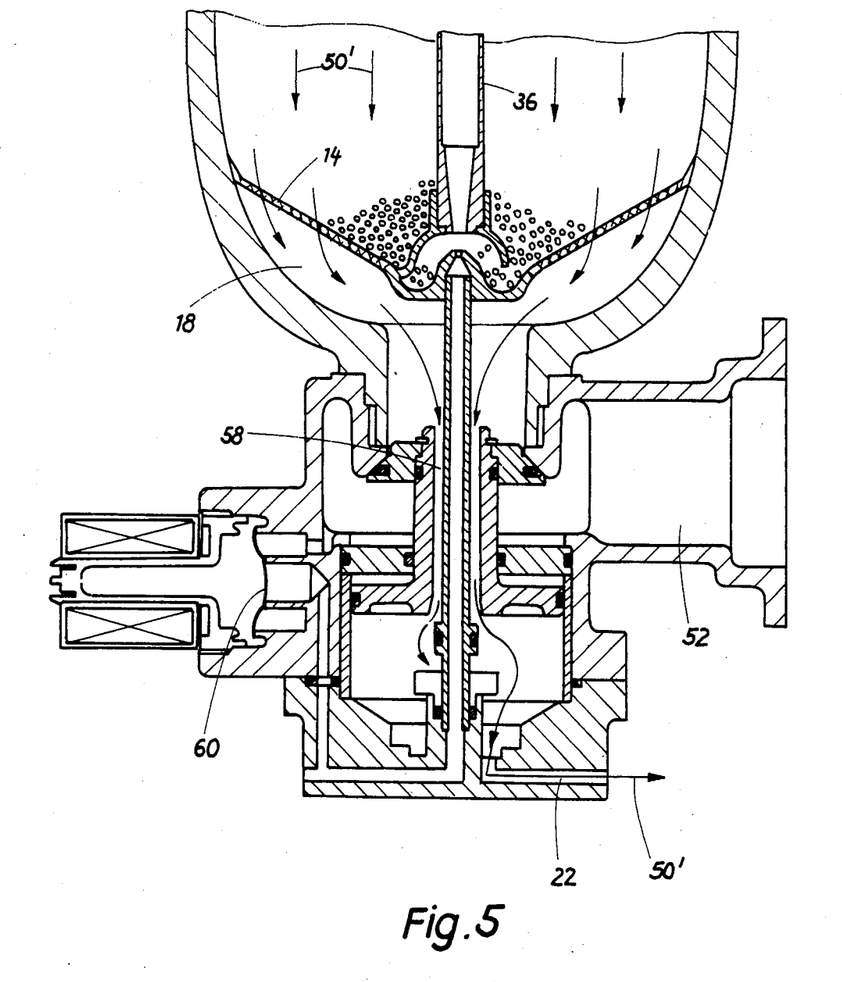

During a regeneration operation (FIG. 2, left-hand column 10 and FIG. 5), regeneration medium, for example common salt, is supplied to the fixed bed 16 through the regeneration medium inlet 28, the collecting chamber 24 and the upper retaining element 12. The regeneration medium flows through the fixed bed 16 from above to below in the direction of arrows 50' and eventually flows through the lower retaining element 14 to the now open annular valve channel 58 of the valve body 58' which is in communication with the waste water outlet 22. As may be seen in FIG. 2, the two ion exchange columns 10 and 10' of the double ion exchange installation are not being regenerated simultaneously; rather they are being regenerated one after another, so that at any time one of the columns, such as 10', operates in the water treatment mode of operation, and softened water can be obtained through the softened water outlet 26 at all times. Herein, the desired liquid flow indicated by the arrows 50 or 50' is adjusted at the upper region automatically by the action of the respective check valve 56.

Figure 3:
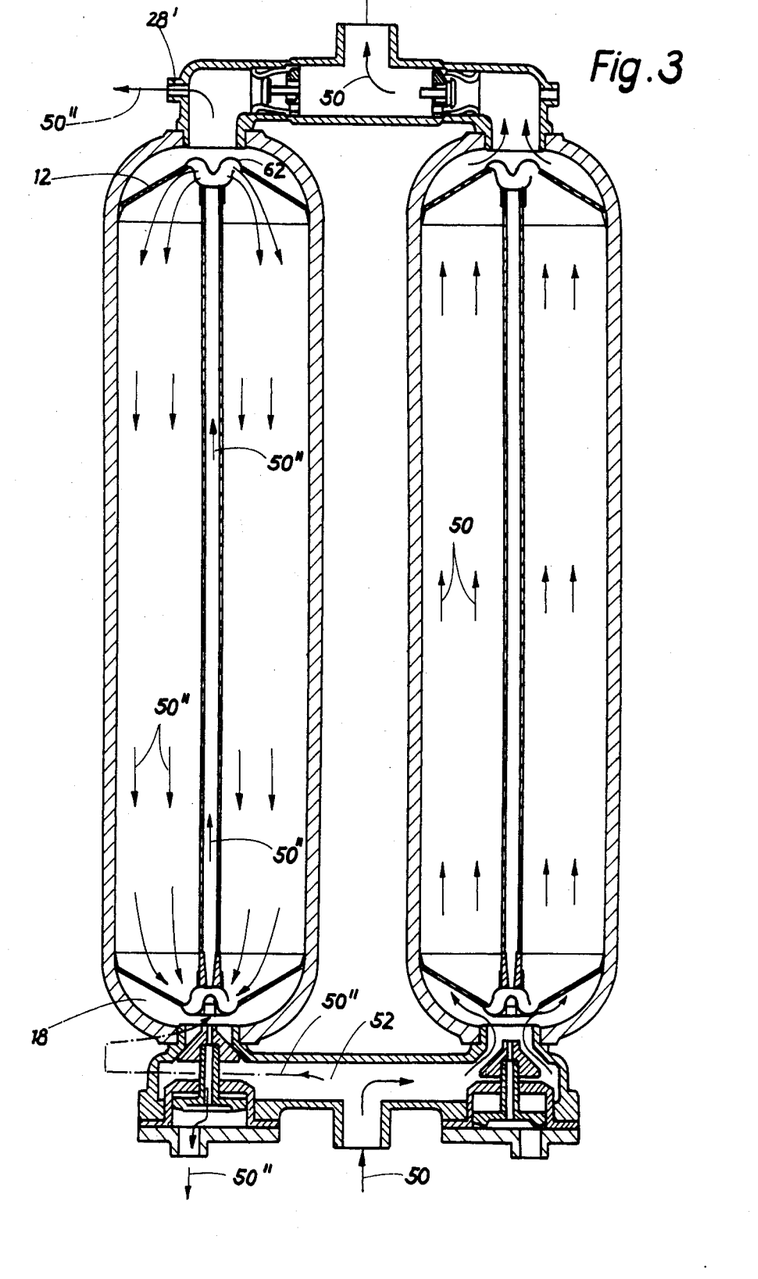

Similar considerations are also applicable to the backwashing and scouring of the resin material 17, this operation being advantageously performed following the regeneration operation. This backwashing and scouring operation or condition is shown in FIGS. 3 (left column) and 6 and is indicated by corresponding flow arrows 50". In this case, the diaphragm valve 60 is open and thus permits flow from the hard water distribution channel 52 to the injector 44. The entraining and rinsing water which emerges under these circumstances at high speed from the propelling jet nozzle 42 reaches the oppositely or alignedly situated receiving nozzle 48 through the chamber 34 and, during this process, generates reduced pressure in the chamber 34. This reduced pressure then continuously draws the ion exchange resin 17 from the fixed bed 16 which replenishes the withdrawn resin 17 by descending from above to below. The granules or particles of the resin 17 are thoroughly mixed with one another by eddy currents existing in the conveying and cleansing riser pipe 36 and are subjected to a mechanical contaminant erosion or removal during this process.

The conveying and cleansing riser pipe 36 opens at its upper end into the outlet chamber 38 from which the loosened resin 17 is carried out by the water through a plurality of openings 62 to descend from above onto the upper surface of the fixed bed 16. The transportation and rinsing water which is loaded with pollutants is on the one hand withdrawn through the upper sieve-shaped retaining element 12 and through the rinsing medium outlet 28'. Another part of the rinsing water passes downwardly through the fixed bed 16 and is there collected in the distribution chamber 18 to be discharged into the waste water outlet 22 through the valve channel 58.

Tests have indicated that a single circulation is sufficient for a successful scouring of the fixed bed 16. As a result, the duration of the backwash can be kept relatively short. So, for instance, in a water softening installation with a bed space of approximately 3 liters, a time period of less than 10 minutes was needed for the regeneration, scouring and backwashing, of which only about 2 minutes were spent on the performance of the circulation/backwash operation.

While the present invention has been described and illustrated herein as embodied in a specific construction of a double ion exchange installation, it is not limited to the details of this particular construction, since various modifications and structural changes are possible and contemplated by the present invention. Thus, the scope of the present invention will be determined exclusively by the appended claims.

What is claimed is:

1. An ion exchange arrangement comprising
   confining means including liquid-permeable upper and lower retaining elements, said lower retaining element being a funnel-shaped sieve bottom;
   at least one fixed bed of a particulate ion exchange resin confined by said confining means;
   means for bounding an inlet chamber situated at a lower region of said fixed bed and open toward said fixed bed, said bounding means including a bottom bulge having said particulate ion exchange resin admitted thereto upwardly of said funnel-shaped sieve bottom, and a dome-shaped lid member extending over said bottom bulge;

means for causing liquid to be treated to flow substantially vertically through said fixed bed during a treating phase of operation of the arrangement;

means for regenerating the particulate ion exchange resin after the same has been contaminated by contaminants captured from the liquid being treated during said treating phase, including a conveying and cleansing pipe extending between said upper and lower retaining elements and having at least one inlet opening situated in the vicinity of said lower retaining element at said inlet chamber, and at least one one outlet opening situated in the vicinity of said upper retaining element, and open toward said fixed bed, and means for directing a stream of a transporting and rinsing liquid through said inlet opening into said conveying and cleansing pipe for continuously withdrawing the particulate ion exchange resin from said fixed bed at the vicinity of said inlet opening, for continuously conveying the withdrawn particulate ion exchange resin through said conveying and cleansing pipe with attendant loosening and cleansing thereof, and for continuously discharging the particulate ion exchange resin from said outlet opening for deposit on said fixed bed while the remaining particulate ion exchange resin of said fixed bed is caused to gradually advance to said inlet opening, said directing means including an injector aimed across said inlet chamber at said inlet opening of said conveying and cleansing pipe and including a propelling jet nozzle which penetrates through said bottom bulge and opens substantially vertically from below into said inlet chamber, and a receiving nozzle situated oppositely to said propelling jet nozzle at an upper region of said inlet chamber and carried by said dome-shaped lid member and diverging toward said conveying and cleansing pipe, and means for supplying the transporting and rinsing liquid to said injector; and means for removing the transporting and rinsing liquid, which has become contaminated by the contaminants released from said contaminated particulate ion exchange resin during the regeneration of the latter, from said fixed bed, including at least one removing outlet situated externally of said retaining elements and vertically spaced from said fixed bed and separated therefrom by one of said retaining elements.

2. The arrangement as defined in claim 1, wherein said conveying and cleansing pipe extends vertically and centrally through said fixed bed.

3. The arrangement as defined in claim 1, wherein said inlet chamber has at least one admission opening extending from said sieve bottom to said bottom bulge.

4. The arrangement as defined in claim 1, wherein said propelling jet nozzle extends into the interior of said inlet chamber and is surrounded by said bottom bulge.

5. The arrangement as defined in claim 1, further comprising means for forming an outlet chamber at and in communication with an upper end of said conveying and cleansing pipe, said outlet chamber being open toward the fixed bed and said forming means including a lid portion which is connected with the upper retaining element for the fixed bed.

6. The arrangement as defined in claim 1, comprising two ion exchange columns capable of having the liquid to be treated flow therethrough in parallel during said treatment phase and each including said regenerating means for regenerating the contaminated ion exchange resin of said fixed bed thereof independently of that of the respectively other ion exchange column.

* * * * *